Sept. 2, 1969     E. V. MEREDITH     3,464,165
GRINDING WHEEL AND SAFEGUARDING MOUNT THEREFOR
Filed March 8, 1967
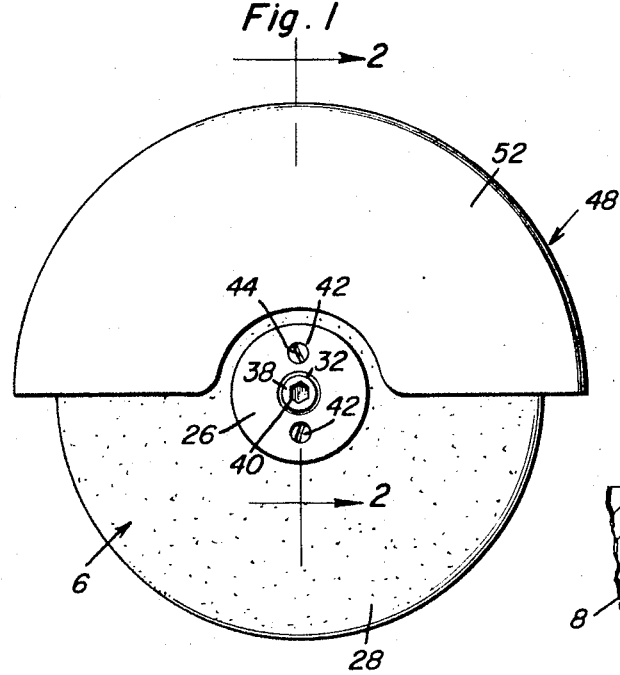
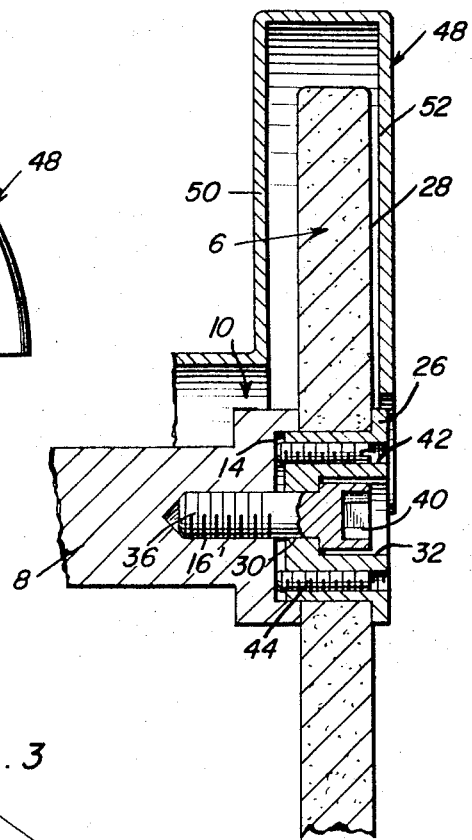
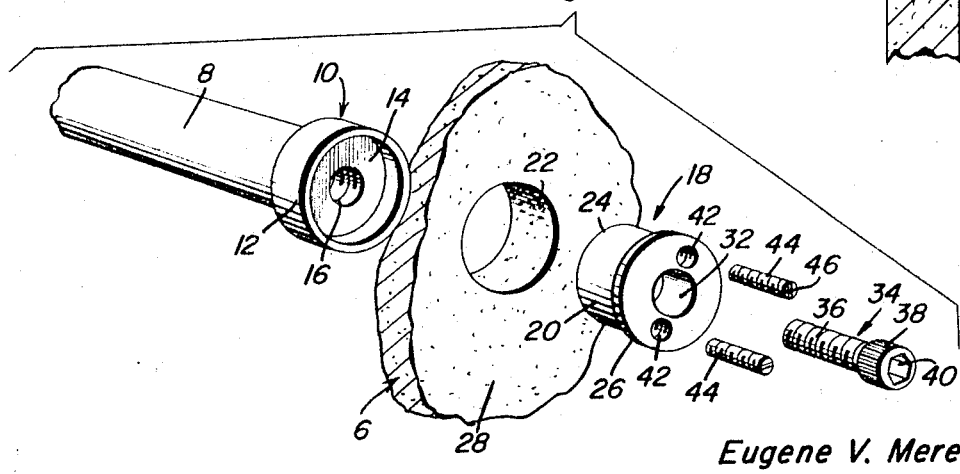
Eugene V. Meredith
INVENTOR.

United States Patent Office 3,464,165
Patented Sept. 2, 1969

3,464,165
GRINDING WHEEL AND SAFEGUARDING
MOUNT THEREFOR
Eugene V. Meredith, R.D. 2, Apalachin, N.Y. 13732
Filed Mar. 8, 1967, Ser. No. 621,510
Int. Cl. B24b 41/04, 45/00, 55/04
U.S. Cl. 51—168                          6 Claims

ABSTRACT OF THE DISCLOSURE

A grinding wheel and mounting means having features found on no other competitive grinder. The outer wall of a semicircular guard housing has minimal but safe clearance relative to outer flat surface of grinding wheel. Permits operator to work closer to workpiece being ground or milled. The means (1) bushing the arbor hole of grinding wheel and (2) mounting and bolting wheel to recessed head at outer end of the main arbor (shaft or mandrel) does not (3) project and (4) accordingly allows tool and die makers to safely grind dies close to guide pins—even with guard in place.

---

This invention pertains to that field of invention which has to do, generally speaking, with guard-equipped grinding and milling tools and, more particularly, to an improved arbor construction having readily attachable and detachable means at the outer or working end thereof and through the medium of which the arbor-equipped hole of a grinding wheel or a corresponding milling tool is readily but reliably mounted for positive driving control.

It is common knowledge to craftsmen, tool and die makers for example, that it is regular practice in the art to utilize a disk-like holding or clamping member against the outer surface of the centrally apertured grinding wheel, similar to a hub cap and to project the screw-threaded shank of the arbor therethrough and to employ a clamping and retaining nut of one type or another to retain the parts in assembled relation. Although it has been realized for some time that the projecting screw-threaded stud and nut currently in use interferes with localizing and holding the grinding wheel in proximity to the workpiece under varying work conditions, the difficulty has apparently not been remedied. However, and in a somewhat allied field of endeavor an arrangement, generally similar to that hereindisclosed, is set forth in a long expired patent to Wooster, 534,540, which shows a dental disk holder wherein the mandrel or arbor has a head at the outer end and an end thrust and clamping disk assembled in a manner to clampingly retain a centrally apertured portion of the disk in an operating but replaceable position. An objective in the present contribution to the art is to provide a strong, reliable and durable stub-type flanged coupling or arbor which is unique in construction and permits the centrally apertured portion of the grinding wheel to be bolted to the headed outer end of the main arbor or shaft in a manner to be hereinafter more fully set forth.

In carrying out the principles of the present invention the outer end of the main arbor or shaft is enlarged and recessed to provide a head, the recess constituting a socket. An axial screw-threaded bore serves to accommodate the screw-threaded shank portion of a headed bolt. The bolt is provided with an Allen wrench socket and this socketed head fits into a counterbore provided therefor in the outer or stub arbor. The latter comprises a collar or bushing which bushes the arbor hole in the grinding wheel. A flange is provided to abut the outer surface of the grinding wheel and the bore and counterbore at the center of the stub arbor serve to confine the headed end of the bolt or screw which when clamped in place is wholly confined and accordingly does not project in an objectionable manner beyond the assembling flange of the stub arbor. Optional setscrews are provided in screw-threaded bores in the stub arbor to assist in dislodging the same if and when it is necessary to do so.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is an end or front view of the improved grinding wheel, guard and mount disclosing the features of the present invention.

FIG. 2 is an enlarged fragmentary view with parts in section and elevation showing the details and their construction and arrangement taken on the plane of the section line 2—2 of FIG. 1, and FIG. 3 is an exploded perspective view with the guard omitted and with the grinding wheel fragmentarily shown.

With reference first to FIG. 3 it will be seen that the supporting or mounting means for the grinding wheel 6 is characterized by what may be broadly described as a composite or two-part wheel mounting arbor. The main shaft or arbor, also referred to as the inner arbor, is denoted by the numeral 8 and terminates at the right hand end (FIG. 3) in an enlarged circular or disk-like head 10 characterized by an endless rim 12 defining an outwardly opening well-like recess or socket 14 at the center of which is an axial screw-threaded bolt-hole 16. The companion or outer arbor component is denoted by the numeral 18 and is sometimes referred to by me as a reverse arbor. More specifically it comprises a hub-like bushing 20 which is smooth surfaced and of a cross-section or diameter to fit into the arbor hole 22 at the axial center of the grinding wheel 6. This part provides a grinding wheel mounting or bushing and it is of a length greater than the cross-sectional thickness of the grinding wheel as shown in FIG. 2 so that the inner end portion 24 projects beyond the wheel and telescopes into the socket or recess 14 to provide the male and female coupling result illustrated in FIG. 2. The outer end of this hub-like bushing is provided with an enlarged flat-faced strong but amply thin flange 26 which when in use firmly and clampingly abuts the coacting outer surface 28 of the grinding wheel. This bushing is also provided with a smooth-surfaced bore 30 (FIG. 2) and a suitably enlarged counterbore 32. The bore 30 serves to permit passage of the smooth portion of the shank of the assembling and clamping bolt 34. More specifically this bolt or screw comprises a screw-threaded shank 36 which passes through and beyond the hole 30 and is screwed into the bolthole 16. The headed outer end comprises a clamping shoulder, the head being denoted at 38 and having an Allen wrench socket 40 therein. When the bolt is screwed home as shown in FIG. 2 it clampingly binds and mounts the grinding wheel 6 which is then sandwiched between the rim 12 and flange 26. It will be noted in this connection that the headed portion 38 of the bolt is wholly and safely confined within the limits of the recess or counterbore 32 and consequently there is no part projecting beyond the flange 26. It is within the purview of the invention to provide the stub arbor with diametrically opposite open-ended screw-threaded bores 42 which can be employed to accommodate setscrews 44 which when in use are assembled as shown in FIG. 2 and can be employed, if and when necessary, to assist in backing out the stub arbor, that is, if it becomes unduly or undesirably lodged in place or otherwise difficult to remove. The setscrews can be provided with screwdriver kerfs 46 or can, if preferred, be provided with Allen sockets (not shown).

Manifestly, it would be within the purview of the description to consider the headed shaft 8 as (1) the main or inner arbor and the companion grinding wheel mounting and clamping hub as (2) the auxiliary arbor.

The inventive concept also includes in addition to the wheel mounting and coupling arbors 8 and 18 a semicircular guard housing 48 and which in and of itself is substantially conventional in that it has inner and outer parallel walls 50 and 52. It will be evident however that because of the improved arbor construction the inner surface of the front or outer wall 52 is in close proximity to and provides minimal clearance between itself and the confronting outer surface 28 of the grinding wheel 6.

It is submitted that the invention herein shown and described aptly and satifactorily serves the purposes for which it is intended, that the construction and coordinate arrangement of component parts is clear and understandable. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination, a main shaft adapted to be mounted for rotation in a manner to transmit rotary motion, said shaft having a tool accommodating end provided with an enlarged head and having an axial open-ended screw-threaded bolthole, a grinding wheel having an arbor hole therein at the central axial portion thereof, a stub arbor complemental to said shaft and having a grinding wheel clamping and assembling flange having end thrust abutment with that portion of the wheel encircling said arbor hole, and having a stub portion lodged in and bushing said arbor hole and aligned with said enlarged head and having a bore providing a second bolthole aligned with said first-named bolthole, a coupling and retaining bolt having a screw-threaded shank passing through said second-named bolthole and screwed into said first-named bolthole and having an end thrust head, said stub arbor being provided with an enlarged counterbore opening through an outer surface and providing a recess, said end thrust head being wholly confined within the limits of said recess, an outer end portion of the head on said main shaft being recessed to provide a socket, said stub arbor being of a length greater than the thickness of said grinding wheel and an end portion thereof projecting beyond a cooperating surface of the grinding wheel and fitting telescopingly and retentively into said socket.

2. The structure defined in and according to claim 1 and wherein said stub arbor is provided with diametrically opposite screw-threaded holes outwardly of said counterbore and inwardly of the periphery of said flange, and setscrews threaded in said holes and having inner end portions adapted to have end thrust engagement with the bottom of the aforementioned socket.

3. The structure defined in and according to claim 2 and wherein the outside diameter of said enlarged head corresponds with the outside diameter of said flange, the diameter of the aforementioned arbor hole corresponding in diameter with said socket, and the cross-section of said stub arbor conforming with the encircling diameter of said arbor hole in a manner to adequately and properly bush said hole and to aptly and reliably clamp the grinding wheel between said flange and an opposed surface of said enlarged head.

4. In combination, a main shaft adapted to be mounted for rotation in a manner to transmit rotary motion, said shaft having a tool accommodating end provided with an enlarged head and having an axial open-ended screw-threaded bolthole, a grinding wheel having an arbor hole therein at the central axial portion thereof, a stub arbor complemental to said shaft and having a grinding wheel clamping and assembling flange having end thrust abutment with that portion of the wheel encircling said arbor hole, and having a stub portion lodged in and bushing said arbor hole and aligned with said enlarged head and having a bore providing a second bolthole aligned with said first-named bolthole, a coupling and retaining bolt having a screw-threaded shank passing through said second-named bolthole and screwed into said first-named bolthole and having an end thrust head, an outer end portion of the head on said main shaft being recessed and providing a socket, said stub arbor being of a length greater than the thickness of said grinding wheel and an end portion thereof projecting beyond a cooperating surface of the grinding wheel and fitting telescopingly and retentively into said socket, and the head on said bolt exposed and having an axial readily accessible Allen wrench socket therein.

5. The structure defined in and according to claim 4 and wherein the outside diameter of said enlarged head corresponds with the outside diameter of said flange, the diameter of the aforementioned arbor hole corresponding in diameter with said socket, and the cross-section of said stub arbor conforming with the encircling diameter of said arbor hole in a manner to adequately and properly bush said hole and to aptly and reliably clamp the grinding wheel between said flange and an opposed surface of said enlarged head.

6. The structure defined in and according to claim 4 and wherein said stub arbor is provided with a pair of diametrically opposite screw-threaded holes, and setscrews screwed into said holes and having inner end portion adapted to have end thrust engagement with a bottoming surface of the aforementioned socket and outer ends with screwdriver kerfs which are readily accessible for convenient use.

References Cited

UNITED STATES PATENTS

| | | | |
|---|---|---|---|
| 1,162,970 | 12/1915 | Binford | 51—168 |
| 1,753,377 | 4/1930 | Jackson | 51—168 |

JAMES L. JONES, JR., Primary Examiner